Aug. 9, 1949.  C. R. LOFGREN  2,478,292
WALL-SUPPORTED FOOD CHOPPER
Filed June 25, 1946
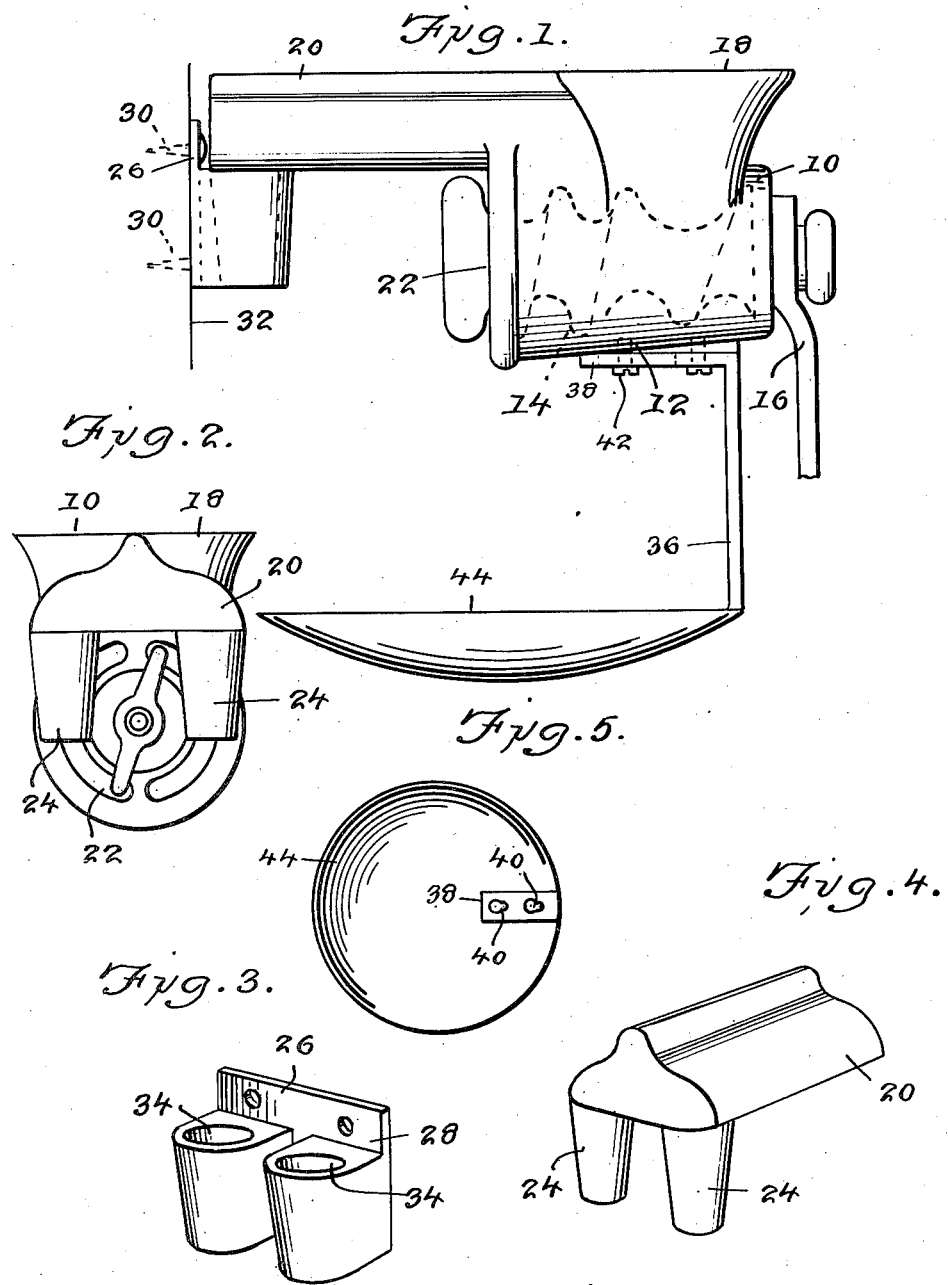
Clarence R. Lofgren
INVENTOR.
BY
Victor J. Evans & Co.
ATTORNEYS Patented Aug. 9, 1949

2,478,292

UNITED STATES PATENT OFFICE 2,478,292

WALL-SUPPORTED FOOD CHOPPER

Clarence Robert Lofgren, Slatersville, R. I.

Application June 25, 1946, Serial No. 679,145

1 Claim. (Cl. 146—182)

My invention relates to food choppers, and has among its objects and advantages the provision of an improved food chopper adapted to be mounted on a wall or the like for support.

Conventional food choppers are difficult to mount. The device is usually clamped to a table top through the medium of the usual clamp screw. When considerable power is applied to the food chopper, it frequently happens that the device swings out of line or wobbles in such manner as to make turning thereof a difficult job. In addition, conventional clamps frequently mar table tops.

Accordingly, an object of my invention is to provide a food chopper which may be secured in an efficient manner to a wall bracket and so designed as to locate the securing means above the outlet of the food chopper, with the bracket structure such as to support the food chopper in a sturdy manner.

In the accompanying drawing:

Figure 1 is a side view of a food chopper in accordance with my invention;

Figure 2 is an end view;

Figure 3 is a perspective view of the wall bracket; and

Figure 4 is a perspective view of the food chopper attachment coacting with the bracket of Figure 3 for detachable connection therewith.

Figure 5 is a top plan view of the receptacle support detached from the food chopper.

In the embodiment selected for illustration, Figure 1 illustrates a food chopper 10 which is conventional in that it includes the usual shell 12, rotary feed screw 14, crank 16 and hopper 18 for feeding the material to be ground into the shell 12.

My invention consists in the provision of an arm 20 cast integrally with the shell 12 and located above the outlet end 22 of the shell. To the outer end of the arm 20 is secured two attaching pins 24 of tapered configuration and spaced some distance apart, one from the other transversely of the arm 20.

A bracket 26 includes a flange 28 for the reception of fastening screws 30 to secure the bracket to the wall or other support 32. The bracket is provided with two sockets 34 contoured in conformity with the tapered pins 24 so that the latter may be inserted in the sockets to support the food chopper 10 horizontally in the manner of Figure 1. The arm 20 and the pins 24 are of sturdy construction and the pins are spaced sufficiently far to restrain the food chopper from any swinging movement when the crank 16 is turned. While pins 24 fit snugly in the sockets 34 to eliminate lost motion, the food chopper may be easily disconnected from the bracket by merely lifting the pins upwardly out of the sockets. The location of the arm 20 is above the outlet end of the food chopper so as not to interfere with the delivery of the material being ground or the receptacle placed thereunder.

To support such a receptacle I provide the bracket 36 having a horizontal arm 38 formed with elongated openings 40 for attachment to the screws 42 secured in suitable openings in the food chopper. A short sliding or reciprocating movement of the bracket will attach or detach the same. A concave support 44 is secured to the bracket to carry thereon a dish or plate not shown and as the ground material extrudes from the chopper it will pass directly into the supported dish or plate.

I claim:

A support for a food chopper having a casing provided with an inlet and an outlet, comprising an arm extending from the casing at right angles to the casing and formed integral with the casing above the plane of the outlet and in the same plane with the inlet, a pair of truncated conical shaped depending attaching pins fixed to the outer free end of the arm at right angles thereto, and a bracket having a pair of sockets tapered to receive the pins on the arm to position said arm in a horizontal plane and said casing in a vertical plane with the inlet uppermost.

CLARENCE ROBERT LOFGREN.

REFERENCES CITED

The following references are of record in the file of this patent:

UNITED STATES PATENTS

| Number | Name | Date |
|---|---|---|
| 622,844 | Ellrich | Apr. 11, 1899 |
| 1,247,938 | Curtenius | Nov. 27, 1917 |
| 1,281,198 | Opfer | Oct. 8, 1918 |
| 1,930,768 | Panzer | Oct. 17, 1933 |
| 1,981,554 | Johnston | Nov. 20, 1934 |
| 2,051,554 | Gasser | Aug. 18, 1936 |
| 2,145,838 | Sakier | Jan. 31, 1939 |
| 2,404,557 | Wood | July 23, 1946 |
| 2,410,709 | Brooks | Nov. 5, 1946 |